Dec. 8, 1931.　　　　J. ROBINSON　　　　1,835,526
AUTOMATIC TRAIN PIPE COUPLING
Original Filed Nov. 5, 1920　　2 Sheets-Sheet 1

INVENTOR
Joseph Robinson
BY
Watson, Coit, Morse & Grindle
ATTORNEY

Dec. 8, 1931.  J. ROBINSON  1,835,526
AUTOMATIC TRAIN PIPE COUPLING
Original Filed Nov. 5, 1920   2 Sheets-Sheet 2

INVENTOR
Joseph Robinson
BY
Watson, Coit, Morse & Grindle
ATTORNEY

Patented Dec. 8, 1931

1,835,526

UNITED STATES PATENT OFFICE

JOSEPH ROBINSON, OF NEW YORK, N. Y.

AUTOMATIC TRAIN PIPE COUPLING

Application filed November 5, 1920, Serial No. 421,960. Renewed June 11, 1930.

My invention relates to automatic train pipe couplings and has among its objects to provide a novel and improved support for such couplings in which the normal distance between the coupling head and the usual bracket may be varied either by rotating the supporting spring in a nut or chamber, the walls of which are threaded or grooved to receive the coils of the spring, or by rotating the nut or chamber relative to the spring. Another object is to provide a resilient abutment for engaging the rear face of the bracket to limit the forward movement of the coupling head, and for cooperating with the supporting spring and bracket to properly support the head.

Figure 1:
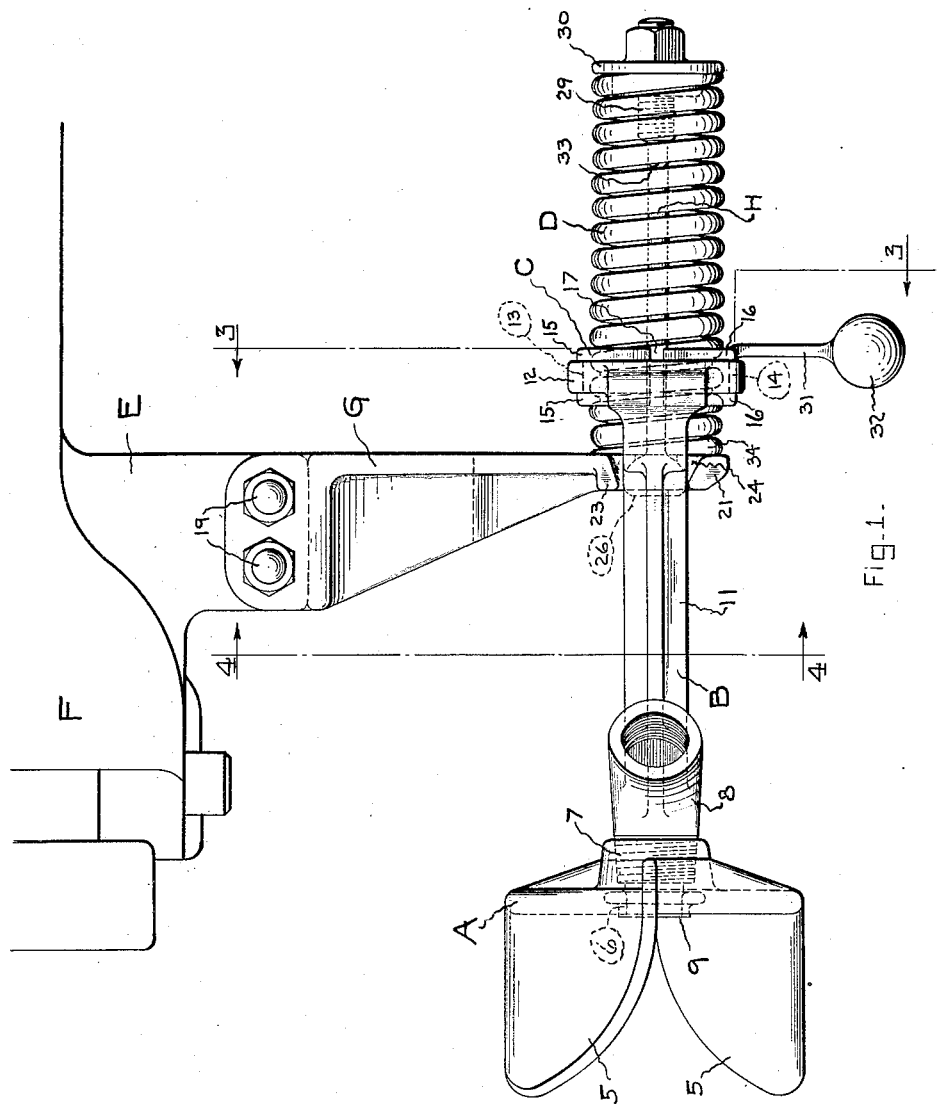

These objects are obtained, and my invention consists in, the combinations, arrangements, and constructions hereinafter described, pointed out in the appended claims, and illustrated in the accompanying drawings in which Figure 1 is a side elevation of my improvement.

Figure 2:
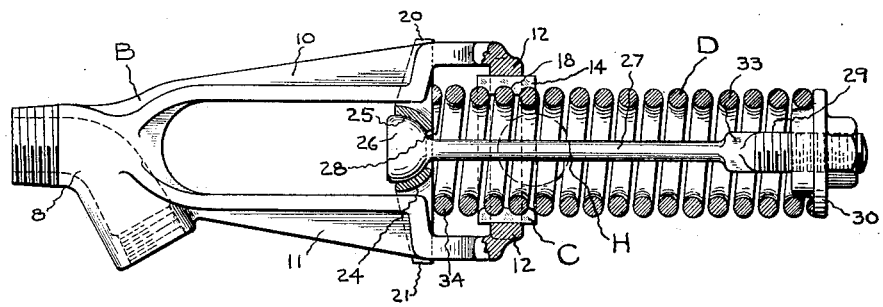

Figure 2 is a sectional plan view thereof with the coupling head omitted.

Figure 3:
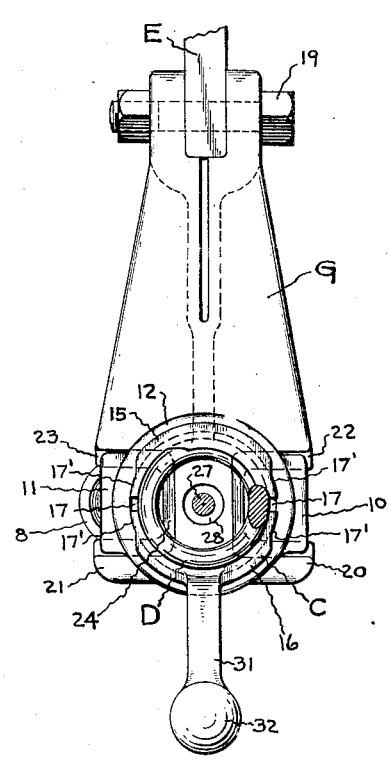
Figure 4:
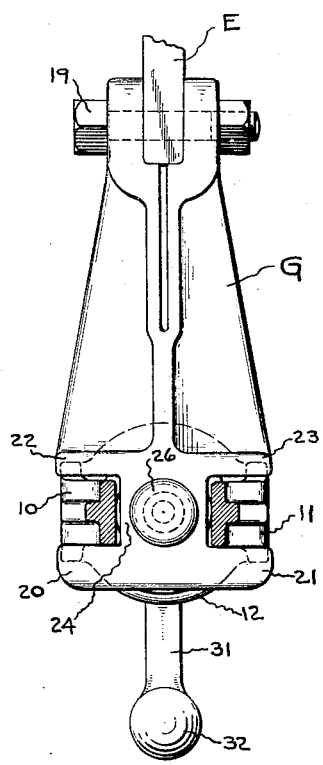

Figure 3 is a rear view of my improvement taken on the line 3—3 of Figure 1, and Figure 4 is a front view of the bracket of my improvement showing the members 10 and 11 as they would appear in section taken on the line 4—4 of Figure 1.

Referring now to the drawings: Any suitable coupling head A may be carried by my improved support. I prefer a head of the type shown having guiding wings 5, and a centrally disposed port or opening 6 threaded at 7 to receive the curved fitting or conduit 8 of my improvement, and suitably carrying at its forward end, in the plane of the face of the coupling head, a gasket 9. My improved support comprises a pipe B having spaced members or straps 10 and 11. These terminate at their forward end in the aforesaid fitting or conduit 8, and at their rear end in a chamber or collar 12, the conduit 8 being threadingly connected to the coupling head A as at 7. The members 10 and 11 are preferably disposed in the horizontal plane though they may be otherwise disposed if desired. Rotatably mounted in the chamber 12 I provide a two part nut or ring C, comprising halves 13 and 14. These halves are flanged as at 15 and 16 to engage the sides of the chamber 12 and prevent longitudinal movement of the nut in the chamber when the parts are assembled— see especially Figure 1. The halves of the nut C are inserted in the chamber separately, the space 17, and the cutaway portion 17' of the flanges 15 and 16, Figures 1 and 3, being sufficient to permit of their ready insertion and correct assembly. They are maintained in the assembled position by the buffer spring D which is screwed into the nut C, the inner walls of the halves 13 and 14 of the nut being provided with spiral grooves, or threads 18, adapted to threadingly receive the coils of the spring. Normally the forward end 34 of the spring projects approximately 1" beyond the chamber or ring 12 in the direction of the conduit 8, though of course it may project to a lesser or greater extent if desired.

Suitably connected, as by bolts 19, to the usual lug E of the car coupler F, I provide a bracket or base G the lower end of which, viewed from the front or rear, has the general outline of a capital I, the lower cross of which forms bearings or trunnions 20 and 21 upon which the members 10 and 11 ride and by which, in cooperation with the portions 22 and 23 of the upper cross of the I, they are positioned relative to and supported on the bracket. In this manner the proper positioning of the coupling head A with respect to the bracket G is also effected. Upon the middle section 24 of the I shaped portion of the bracket, I provide a concave socket 25, and in this I mount for rocking movement therein, the convex head 26 of the pivot device H. A shank 27, integral with the head 26, extends through the opening 28 in the socket 25 and bracket G, and through the spring D to the rear thereof and is there provided with a threaded portion 29. Upon this threaded portion, an abutment or stop 30 is adjustably mounted and serves to maintain the buffer spring D in position with respect to the pivot device H, and to place the spring under compression with the forward end 34 thereof firmly pressed against the rear face of the bracket G, as shown especially in Figures 1 and 2.

The foregoing construction produces an improved support in which the distance between the coupling head A and the bracket G may be readily varied to compensate for the wear occurring on the car coupler knuckle in service, and in which the coupling head is yieldingly supported for universal movement by the buffer spring D and the aforesaid universal joint carried by the bracket G. The engagement of the forward end 34 of the spring with the rear face of the bracket produces a resilient abutment for limiting the forward movement of the coupling head relative to the bracket, which forward end may slide laterally in any direction, on the rear face of the bracket in all coupling operation where such movement is required. To adjust the coupling head A, and thus compensate for the wear aforesaid, it is but necessary to rotate the nut C through the medium of its handle or crank 31, formed integral with the nut, or to rotate the spring D itself. Either operation will cause the coupling head A to move forward or back according to the direction in which the nut or spring is rotated. The ball 32 on the crank 31 serves to yieldingly maintain the nut in the adjusted position while the stop or abutment 30, under the tension of the spring D, prevents the spring from turning, or working loose in service. To prevent the shank 27 of the pivot device H from turning when the stop 30 is being assembled or adjusted along the shank, I provide the latter with a rectangularly shaped portion 33 which may be embraced by a suitable wrench and thus held against rotation during the adjustment of the stop 30. The coils of the spring D are, of course, spaced a sufficient distance apart to permit of the ready insertion of this wrench there between, and so as to give to the spring the correct and proper design for the purpose intended.

What I claim is:

1. In an automatic train pipe coupling, the combination with a coupling head and a supporting bracket therefor, said bracket having a plane unobstructed surface thereon, of a spring for extending the head, one end of said spring bearing directly upon said surface and adapted to freely move laterally thereon.

2. In an automatic train pipe coupling, the combination with a coupling head and a supporting bracket therefor, of a spring, and a yieldable abutment engaging said bracket for limiting the travel of said head forwardly of the bracket, said bracket having a plane unobstructed surface thereon, said abutment comprising the forward end of said spring and being adapted to slide laterally on said surface when the cars couple under conditions of disalignment.

3. In an automatic train pipe coupling, the combination of a coupling head, a bracket, a member extending from said head past said bracket, a spring between the rear side of said bracket and said member, and rotatable means carried by said member and engaging said spring for adjusting the member along said spring.

4. In an automatic train pipe coupling, the combination with a coupling head and a supporting bracket therefor, of means for projecting said coupling head forward of said bracket and for varying the extent of such projection, said means comprising a helical spring, and a member extending from said head to the rear of said bracket and carrying thereat a perforated portion on the inner walls of which is provided a helical groove adapted to receive a coil of said spring, said portion being rotatable relative to said member and spring.

5. In an automatic train pipe coupling, the combination with a coupling head and a supporting bracket therefor, of means for projecting said coupling head forward of said bracket and for varying the extent of such projection, said means comprising a spring, a member extending from said coupling head in the direction of said bracket, and a nut threaded to said spring and rotatably supported on said member.

6. In an automatic train pipe connector, the combination of a coupling head, a supporting bracket therefor, a member secured to said head and extending rearwardly past said bracket, a tie rod pivotally engaging said bracket and extending rearwardly therefrom and having an abutment adjacent its rear end, a spring surrounding said tie rod and engaging at one end against said abutment and at the other end against said bracket, means carried by said member and engaging said spring intermediate the ends thereof, said means being rotatable relative to said member and said spring.

7. In an automatic train pipe connector, the combination of a coupling head, a supporting bracket therefor, a member secured to said head and extending rearwardly past said bracket, a tie rod pivotally engaging said bracket and extending rearwardly therefrom and having an abutment adjacent its rear end, a spring surrounding said tie rod and engaging at one end against said abutment and at the other end against said bracket, a weighted nut rotatably carried by said member and engaging said spring for moving said member relative to said spring.

8. In an automatic train pipe connector, in combination with a coupling head, a supporting bracket therefor, a member secured to said head and extending rearwardly thereof and comprising spaced portions which span said bracket, means on said bracket for sustaining said head supporting member against downward movement, a tie rod pivotally connected with said bracket and extending rearwardly thereof, a buffer spring mounted on said tie rod and having one end thereof arranged in contact with said bracket, a part carried by said head supporting member and surrounding said spring intermediate the ends thereof and a nut rotatably mounted on said spring and cooperating with said part for positioning said head supporting member relative to the bracket.

9. In an automatic train pipe connector, the combination of a coupling head, a supporting bracket therefor, a member secured to said head and extending rearwardly and comprising spaced portions arranged on opposite sides of said bracket, means on said bracket for supporting said member against downward movement, a tie rod pivotally associated with said bracket and extending rearwardly therefrom, a buffer spring mounted on said tie rod with one end thereof resting against said bracket, a collar carried by the rear end of said head supporting member and surrounding said spring and a nut rotatably mounted on said spring and cooperating with said collar to position said head supporting member relative to the bracket.

In testimony whereof I affix my signature.

JOSEPH ROBINSON.